United States Patent [19]

Heilmann

[11] 4,157,418

[45] Jun. 5, 1979

[54] ACRYLIC FUNCTIONAL AMINOCARBOXYLIC ACIDS AND DERIVATIVES AS COMPONENTS OF PRESSURE SENSITIVE ADHESIVES

[75] Inventor: Steven M. Heilmann, North Saint Paul, Minn.

[73] Assignee: Minnesota Mining and Manufacturing Company, Saint Paul, Minn.

[21] Appl. No.: 875,988

[22] Filed: Feb. 8, 1978

[51] Int. Cl.² ............................ C09J 7/00; C09J 7/02
[52] U.S. Cl. .................................... 428/355; 156/332; 428/500; 428/483; 428/510; 428/516; 428/520; 526/304; 526/263
[58] Field of Search ................ 526/304, 263, 229; 428/355, 500; 156/332

[56] References Cited

U.S. PATENT DOCUMENTS

| | | | |
|---|---|---|---|
| 2,884,126 | 4/1959 | Ulrich | 428/355 |
| 2,976,204 | 3/1961 | Young et al. | 156/332 |
| 3,284,423 | 11/1966 | Knapp | 526/229 |
| 3,558,374 | 1/1971 | Doehnert | 428/355 |
| 3,735,003 | 5/1973 | Zimmer | 526/304 |
| 3,790,520 | 2/1974 | Ludwig | 526/304 |

*Primary Examiner*—George F. Lesmes
*Assistant Examiner*—E. Rollins Buffalow
*Attorney, Agent, or Firm*—Cruzan Alexander; Donald M. Sell

[57] ABSTRACT

High performance thermoplastic pressure sensitive adhesives are prepared by the copolymerization of N-(meth)-acryloylamino acids and acid derivatives with long-chained alkyl acrylates. The copolymers can be formulated into tapes that possess an excellent threefold balance of the necessary tape properties of tack, adhesion and cohesion.

8 Claims, No Drawings

ACRYLIC FUNCTIONAL AMINOCARBOXYLIC ACIDS AND DERIVATIVES AS COMPONENTS OF PRESSURE SENSITIVE ADHESIVES

This invention relates to pressure sensitive adhesives having excellent threefold balance of properties of tack, adhesion and cohesion and particularly to copolymers of long-chained alkyl acrylates and N-acryloyl- or N-methacryloyl amino acids and derivatives thereof.

Pressure sensitive adhesives comprised of homopolymers of long-chained alkyl acrylate esters lack an adequate balance of tack, adhesion and cohesion. It has generally been found necessary to include a comonomer containing a polar functional group such as carboxyl, amide or nitrile with the alkyl acrylate in order to obtain such a balance of properties. Thus, in U.S. Pat. Nos. 2,772,251; 2,884,126; 2,976,204 and 3,284,423 iso-amyl acrylate, iso-octyl acrylate, and the like have been copolymerized with such polar comonomers as acrylic acid, methacrylic acid, itaconic acid, acrylamide, methacrylamide and acrylonitrile. Achieving sufficiently high molecular weights with some of these monomers is difficult because they polymerize very slowly and/or contain labile hydrogen atoms that can function as chain transfer agents curtailing the degree of polymerization. A further disadvantage of the copolymers of the prior art is that increasing the concentration of polar comonomer relative to the alkyl acrylate ester results in loss in tack and adhesion even if there is improvement in cohesive strength so that the balance of these properties is lost.

It is an aim and object of this invention to provide copolymers for producing pressure sensitive adhesives having a desirable level of tape properties of tack, adhesion and cohesion. Other objects will be evident herein.

In accordance with the above and other objects of the invention, there are provided novel thermoplastic pressure sensitive adhesive compositions which possess an optimization of the three tape properties of tack, adhesion and cohesion as shown by evaluation as pressure sensitive adhesive stocks such as sheets and tapes. Cohesive integrity may be improved by methods known in the art when desired, e.g., by crosslinking.

The novel thermoplastic pressure sensitive adhesive compositions for application at ambient temperatures, e.g., 15°–30° C., comprise copolymers consisting essentially of monomers of (A) at least 80 mole% of one or more monomeric acrylic acid esters of primary and/or secondary alcohol containing from four to eight carbon atoms and (B) not over 20 mole% of at least one comonomer represented by the structural formula:

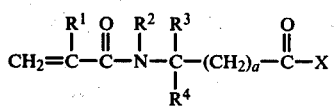

wherein
R$^1$ is —H or methyl;
R$^2$ is H, alkyl of 1–4 carbon atoms or —CH$_2$CH$_2$CN;
R$^3$ is H or alkyl of 1–4 carbon atoms;
R$^4$ is H, alkyl of 1–4 carbon atoms, —CH$_2$C$_6$H$_5$, —(CH$_2$)$_2$—SCH$_3$, and

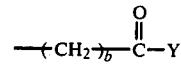

where b is 1 or 2, where Y is NH$_2$ or OH;
a is 0, 1, 2, and 3;
X is Y and R$^2$ and R$^3$ together can be (CH$_2$)$_3$.

Further there are provided pressure sensitive adhesive stocks in sheet form and tapes wound upon themselves in rolls having the above pressure sensitive adhesive compositions on at least one surface.

For convenience in the present specification and claims it is sometimes convenient to refer to the acrylate esters of (A) above as "class (A) monomers" and correspondingly to refer to the comonomers of (B) above as "class (B) monomers." It will be noted that many of the class (B) monomers are novel useful comonomers not heretofore available.

Class (A) monomers are acrylate esters of primary and secondary alcohols of four to eight carbon atoms. They may be employed individually or in combination of two or more and may comprise small amounts, up to about 25% of alkyl methacrylates. Such esters homopolymerize to sticky, stretchable, elastic polymer masses. Suitable class (A) monomers include n-butyl acrylate, iso-butyl acrylate, sec-butyl acrylate, n-hexyl acrylate, 2-ethylhexyl acrylate, iso-octyl acrylate, iso-amyl acrylate, sec-amyl acrylate and the like. Especially preferred class (A) monomers are iso-octyl acrylate and 2-ethylhexyl acrylate.

Class (B) monomers are N-acryloyl and N-methacryloyl derivatives of amino acids and particularly of natural amino acids in optically active or racemic forms. The two are denominated jointly as N-(meth)acryloyl derivatives. Although described herein particularly with individual N-(meth)acryloyl amino acids, it is within the contemplation of the invention to employ N-(meth)acryloyl derivatives of mixed amino acids obtained by hydrolysis of natural proteinaceous materials such as gluten, gelatin, albumin, casein, hide, etc.

Suitable class (B) monomers include the N-acryloyl and N-methacryloyl derivatives of amino acids such as glycine, alanine, β-alanine, 4-aminobutyric acid, 5-aminovaleric acid, valine, leucine, isoleucine, norleucine, phenylglycine, phenylalanine, methionine, cystine, aspartic acid, glutamic acid, asparagine, glutamine, proline, N-methylglycine, N-(2-cyanoethyl)glycine, N-butylglutamic acid and the like; N-acryloyl and N-methacryloyl derivatives of amino acid amides such as glycinamide, alanamide, N-butylalanamide and the like.

Although the aforementioned compounds are generally superior to conventional comonomers for the production of pressure sensitive adhesive formulations from alkyl acrylate esters, especially preferred are the N-(meth)acryloyl amino acids of the invention.

The class (A) and (B) monomers can be copolymerized by standard techniques, e.g., using free radical initiators in solvents or aqueous emulsion. Suitable initiators include persulfates, benzoyl peroxide, di-t-butyl-perioxide, azobis(iso-butyronitrile) and the like. Suitable polymerization solvents include ethyl acetate, acetone, methyl ethyl ketone, benzonitrile and the like.

One convenient procedure which has been employed is to conduct the polymerization solution in acetone at a monomer mole fraction of 0.18, using azobis(iso-butyronitrile) (0.3 mole percent based on total moles of monomer) and heating with agitation at 55° C. for 21 hours followed by heating at 60° C. for 3 hours. As is well known in the art, vinyl polymerizations can be conducted over a wide range of conditions, the solution viscosity and desired molecular weight of products determining specific conditions. Thus, suitable monomer concentrations can be a mole fraction from about 0.05 to 0.50 or preferably 0.1 to about 0.25; catalyst concentrations can be from about 0.1 to 1.0%; temperatures can be from 25° C. or less to 100° C.; and reaction times can be from a few minutes to several days. Conversions of about 95% polymer can be achieved to copolymers with weight-average molecular weights of about one to about ten million as measured by gel permeation chromatography of diazomethane treated samples in tetrahydrofuran. The variation in molecular weight is attributed to chain transfer reactions that result from labile hydrogen atoms present in the particular class (B) comonomer. Achieving high molecular weight is an important measure of the effectiveness of the particular class (B) comonomer as a component of a pressure sensitive adhesive.

As will be apparent to one skilled in the art, the relative proportion of the class (A) and class (B) monomers in a particular copolymer is dictated by the end use of the copolymer. For use in tapes possessing an optimization of properties at room temperature, for example, the monomers are formulated so that the resulting copolymer generally has a glass transition temperature range as measured by differential thermal analysis in which midpoints are between about −60° and −30° C. For such a purpose the class (B) monomers can be present up to about 20 mole percent in a copolymer with, e.g., iso-octyl acrylate.

Homopolymers of class (B) monomers are hard, brittle solids resembling, e.g., polyacrylamide which, because of very strong interpolymer hydrogen bonding, do not exhibit glass temperatures. Instead, softening or even decomposition may occur on heating to temperatures generally above 200° C. Copolymerization in minor proportions with class (A) monomers in major proportions results in copolymers more closely resembling homopolymers of the class (A) monomers, i.e. copolymers which are sticky, stretchable and elastic, because the glass transition temperature of the copolymer is considerably lower than that of the homopolymer of the class (B) monomer. Thus, if the temperature at which a tape is to be used is greater than about 25° C., formulations which will possess an adequate balance of tack, adhesion and cohesion at that temperature will result when the concentration of the class (B) comonomer in the copolymer is increased above the proportions noted above for room temperature tape formulations, i.e., above 20 mole percent in an iso-octyl acrylate copolymer. Generally, however, the molar proportion of the class (A) monomers exceeds that of the class (B) monomers for most tape applications and the proportion of the latter is below 50 mole percent.

Solutions of copolymers of the invention of class (A) monomers and class (B) comonomers are produced by polymerization in suitable solvents as noted above; other solvents such as tetrahydrofuran can also be added as diluents or to replace such low boiling solvents as acetone. The copolymer solutions can be coated on a suitable substrate by any desired coating technique either directly or after priming or subcoating the surface as is well known in the art using convenient subcoats or primers. Substrates for tapes include polyester, polyamide, poly(vinyl chloride), polyethylene, polyolefin, polysiloxane, cellulose acetate, paper, fabric, leather.

Although a pressure sensitive tape is usually said to possess a fourfold balance of properties, namely adhesion, cohesion, stretchiness and elasticity, the last two can be combined into a qualitative "thumb appeal" parameter which can be described by examining the tack of the adhesive. Thus, for the purposes of this specification the usual fourfold balance of tape properties has been reduced to a threefold balance of adhesion, cohesion and tack.

For the tape testing procedures the copolymer solutions are knife coated onto polyester film (0.06 mm) to a thickness of about 0.25 mm and dried in an air circulating oven at 88° C. for 10 minutes to remove solvent. The dry coating weights of adhesive were 64.5 grams per square meter. The tape tests were evaluated at 21° C. and 50% relative humidity and are described below:

Tape Adhesion Test

A 1.3 cm wide strip of the adhesive coated on the polyester film is placed adhesive face down on a clean, horizontal glass plate. The strip which is conveniently 50 cm long is pressed into adhesive contact with the glass by passing a hard rubber roller weighing 2 kg over the strip at a rate of about 4 cm/sec. The tape is removed using an attached spring scale so that the portion of the tape removed comes back adjacent but not quite touching the portion still adherently attached (hence, the test is referred to as a 180° peel adhesion test). The scale reading in grams is a measure of the adhesion to glass. The data are reported as the average of the range of numbers observed during three such trials.

Tape Cohesion Test

The cohesive strengths of the adhesives are compared by means of the following shear strength test. The tape is prepared on polyester film (0.06 mm) as described above. A 2.54 cm wide strip of the tape is placed adhesive face down on a clean stainless steel plate so that they overlap each other by 2.54 cm and provide an adhesive contact area of 6.4 cm². The tape and stainless steel plate are pressed into contact by passing a 2 kg hard rubber roller over the contacting area at 0.5 cm/sec. The plate is then positioned essentially vertically so that the non-adherent tape makes a reflex angle with plate sufficient to prevent peeling away from the plate (about 182°). The bond is then tensioned by the application of force of 500 grams applied as a weight hanging from the tape. The time required for the tape to shear away from the steel plate is measured and recorded in minutes as the average of three trials. In all cases the mode of failure is cohesive.

Tape Tack Test

The tack measurement is made using a Polyken Probe Tack Tester available from TMI Testing Machines, Incorporated. The test sample is applied backing side down to a double coated tape (3M Brand No. 665) which in turn is adhered to a small glass cover slide. This apparatus is then adhered test sample adhesive down to one end of a brass cylinder weighing 20 grams. The rodlike stainless steel probe (contact area of 0.02 cm²) is then brought into contact in the brass cylinder with the test adhesive so that the cylinder is raised and supported by the probe. (The effective pressure forcing the adhesive and the probe into contact is about 1000 g/cm²). The probe is suspended for 5 seconds and then withdrawn at a velocity of 1 cm/sec. The maximum force required for removal is measured and recorded. Nine trials are performed for each of the adhesives because of the range of values observed. The highest and lowest values are discarded, and the remaining seven values averaged.

Having thus described the invention in general terms it is now further described by examples in which molar parts represent moles.

EXAMPLES 1–17

The general procedure for acryloylation or methacryloylation of amino acids and derivatives is as follows:

A 500 milliliter three-necked Morton flask equipped with two dropping funnels, a condenser, a thermometer, and a mechanical stirrer is charged with one mole of the amino acid or acid derivative (racemic except for Example 5 which is optically active) and the equivalent amount of sodium hydroxide (one or two moles) dissolved in about 150 ml of water is added with cooling so that the temperature does not exceed 10° C. In some preparations the sodium salt(s) formed are not completely soluble and more water is added as needed to dissolve the salt(s). Acryloyl or methacryloyl chloride (0.95 mole) is added dropwise to the clear, colorless solution of salts with stirring while maintaining the temperature at 10° C. or lower. It will be recognized that these acid chlorides may be contaminated with other acyl halides but a purity of at least about 90% is preferred. Simultaneously, sodium hydroxide solution (0.95 mole in 75 ml. of water) is added to neutralize HCl liberated by the reaction. After the addition is complete the reaction mixture is stirred in an ice bath for two hours. The reaction mixture is then acidified with concentrated hydrochloric acid to about pH 2. The N-acryloyl or N-methacryloyl derivative generally crystallizes on standing overnight and is collected and dried. Alternatively it may be extracted using ethyl acetate and subsequently crystallized from the same solvent. The product is generally of sufficient purity to be used in copolymerization reactions but recrystallization may be employed to enhance purity. The yield is about 60–90% of theoretical. The N-acryloyl and N-methacryloyl and derivatives are white crystalline solids characterized by melting points as indicated in Table 1. The Example numbers are used hereafter to refer to monomers. Some are further characterized by nuclear magnetic resonance, infrared absorption and mass spectral data.

Table 1

| Example | Product Monomer | Melting Range (°C.) |
|---|---|---|
| 1 | N-acryloylglycine | 127.5–129.5 |
| 2 | N-methacryloylglycine | 104–105.5 |
| 3 | N-acryloyl-N-methylglycine | 109.5–111 |
| 4 | N-acryloyl-N-(β-cyanoethyl)glycine | 103–104 |
| 5 | N-acryloyl-L-proline | 116–117 |
| 6 | N-acryloylalanine | 127.5–129.5 |
| 7 | N-acryloylmethylalanine | 185–186.5 |
| 8 | N-methacryloylmethylalanine | 160–162 |
| 9 | N-acryloylnorleucine | 100–102.5 |
| 10 | N-acryloylphenylalanine | 121.5–123 |
| 11 | N-acryloylmethionine | 93.5–95 |
| 12 | N-acryloylaspartic acid | 157.5–158(d) |
| 13 | N-acryloylasparagine | polymerized |
| 14 | N-acryloyl-β-alanine | 96.5–99 |
| 15 | N-acryloyl-4-amino butyric acid | 98.5–100.5 |
| 16 | N-acryloyl-5-aminovaleric acid | 92–94.5 |

Table 1-continued

| Example | Product Monomer | Melting Range (°C.) |
|---|---|---|
| 17 | N-acryloylglycinamide | 136–136.5 |

Spectral characteristics and analyses of new componds are as follows:

Compound 3, N-acryloyl-N-methyl glycine.

Infrared (in KBr): 2700–2400 cm$^{-1}$ (w)(carboxyl OH); 1710 cm$^{-1}$ (S)(C=O); 1640 cm$^{-1}$ (S)(C=C).

NMR (in D$_2$O) 3.00 and 3.20δ (S, 3H, N—CH$_3$); 4.25 and 4.35δ (S, 2H, —CH$_2$CO$_2$H); 5.75–6.90δ (m, 3H, —CH$_2$=CH—).

Mass spectrum: molecular ion (m/e=143).

Analysis: Exact mass for C$_6$H$_9$NO$_3$; Calc. 143.058; found 143.058.

Compound 4, N-acryloyl-N-(β-cyanoethyl)glycine.

Infrared (in KBr): 2750–2500 cm$^{-1}$ (m)(carboxyl OH); 2205 cm$^{-1}$ (m)(C≡N); 1740 cm$^{-1}$ (S)(C=O); 1730 cm$^{-1}$ (m)(C=O); 1640 cm$^{-1}$ (S)(C=C).

NMR (in D$_2$O): 2.75–3.00δ (m, 2H, —CH$_2$CN); 3.75–4.10δ (m, 2H, N—CH$_2$—); 4.30 and 4.45δ (S, 2H, —CH$_2$CO$_2$H); 5.80–7.10δ (m, 3H, CH$_2$=CH—).

Mass Spectrum: molecular ion (m/e=182)

Analysis: Exact mass for C$_8$H$_{10}$N$_2$O$_3$: Calc. 182.069; found 182.069.

Compound 5, N-acryloyl-L-proline.

Infrared (in mineral oil, i.e. Nujol): 2700–2400 cm$^{-1}$ (w)(carboxyl OH); 1740 cm$^{-1}$ (S)(C=O); 1650 cm$^{-1}$ (S)(C=C).

NMR (in D$_2$O): 1.80–2.50δ (m, 4H, NCH$_2$CH$_2$CH$_2$); 3.52 and 3.70δ (t(J=6 cps), 2H, N—CH$_2$—); 4.40–4.55δ (m, 1H, CH—CO$_2$H); 5.70–6.75δ (m, 3H, CH$_2$=CH—).

Mass spectrum: molecular ion (m/e=169)

Analysis: Exact mass for C$_8$H$_{11}$NO$_3$: Calc. 169.074; found 169.074.

Compound 9, N-acryloyl norleucine.

Infrared (in mineral oil, i.e., Nujol): 3310 cm$^{-1}$ (S)(NH); 2700–2400 cm$^{-1}$ (w)(carboxyl OH); 1760 cm$^{-1}$ (S)(C=O); 1720 cm$^{-1}$ (S)(C=O); 1630 cm$^{-1}$ (S)(C=C).

NMR (in D$_2$O): 0.70δ (t(J=5 cps), 3H, —CH$_3$); 1.00–1.50 δ (m, 4H, —CH$_2$CH$_2$CH$_3$); 1.60–2.00 δ (m, 2H, —CH—CH$_2$—); 4.30–4.50 δ (m, 1H, —CH—CH$_2$—); 5.70–6.50 δ (m, 3H, CH$_2$=CH—).

Mass spectrum: molecular ion (m/e=185).

Analysis: Exact mass for C$_9$H$_{15}$NO$_3$: Calc. 185.105; found 185.106.

Compund 11, N-acryloyl methionine.

Infrared (in mineral oil, i.e., Nujol): 3315 cm$^{-1}$ (S)(NH); 2700–2400 cm$^{-1}$ (w)(carboxyl OH); 1735 cm$^{-1}$ (S)(C=O); 1715 cm$^{-1}$ (S)(C=O); 1650 cm$^{-1}$ (S)(C=C); 1225 cm$^{-1}$ (S)(S—CH$_2$—).

NMR (in D$_2$O): 2.15 δ (S, 3H, SCH$_3$); 2.00–2.30 δ (m, 2H, CH$_2$S); 2.55–2.70 δ (m, 2H, —CH—CH$_2$—); 4.60–4.70 δ (m, 1H, —CH—CH$_2$—); 5.80–6.40 δ (m, 3H, CH$_2$=CH—).

Mass spectrum: molecular ion (m/e=2.03).

Analysis: Exact mass for C$_8$H$_{13}$NO$_3$S: Calc. 203.061; found 203.060.

Compound 12, N-acryloyl aspartic acid.

Infrared (in mineral oil, i.e., Nujol): 3360 cm$^{-1}$ (S)(NH); 2750-2500 cm$^{-1}$ (w)(carboxyl OH); 1735 cm$^{-1}$ (S)(C=O); 1700 cm$^{-1}$ (S)(C=O); 1655 cm$^{-1}$ (S)(C=O).

NMR (in D$_2$O): 3.00 δ (d(J=8 cps), 2H, —CH$_2$—); 4.806 (t(J=6 cps), 1H, —CH—).

Mass spectrum: molecular ion+1 (chemical ionization; m/e=188).

Analysis: Calculated for C$_7$H$_9$NO$_5$: C 44.9%, H 4.8%, N 7.5%; found C 44.6%, H 4.8%, N 7.3%.

Compound 13, N-acryloylasparagine.

Infrared (in mineral oil, i.e. Nujol): 3390 cm$^{-1}$ (S)(NH); 3200 cm$^{-1}$ (w)(NH); 2650-2375 cm$^{-1}$ (w)(carboxyl OH); 1730 cm$^{-1}$ (w)(C=O); 1720 cm$^{-1}$ (S)(C=O); 1660 cm$^{-1}$ (S)(C=C).

NMR (in D$_2$O): 2.92 δ (d(J=8 cps), 2H, —CH$_2$CONH$_2$); 4.85 δ (t(J=6 cps), 1H, CHCOOH); 5.80-6.45 δ (m, 3H, CH$_2$=CH—).

Mass spectrum: Molecular ion+1 (chemical ionization, m/e=187).

Analysis: Calculated for C$_7$H$_{10}$N$_2$O$_4$: C 45.2%, H 5.4%, N 15.0%; found C 45.1%, H 5.4%, N 14.9%.

Compound 16, N-acryloyl-5-aminovaleric acid.

Infrared (in KBr): 3275 cm$^{-1}$ (S)(NH); 2775-2550 cm$^{-1}$ (w)(carboxyl OH); 1695 cm$^{-1}$ (S)(C=O); 1645 cm$^{-1}$ (S)(C=C).

NMR (in D$_2$O): 1.50-1.80 δ (m, 4H, —CH$_2$CH$_2$—) 2.48 δ (t(J=6 cps), 2H, —CH$_2$CO—); 3.30 δ (t(J=6 cps), 2H, —CH$_2$—N); 5.75-6.35 δ (m, 3H, CH$_2$=CH—).

Mass spectrum: molecular ion (m/e=171).

Analysis: exact mass for C$_8$H$_{13}$NO$_3$: Calc. 171.089; found 171.092.

EXAMPLE 18

The general procedure for copolymerization is as follows:

A 450 ml amber glass bottle is charged with 93 molar parts of class (A) monomer and 7 molar parts of class (B) monomer (or appropriate conventional polar comonomer in comparative examples). Acetone (450 molar parts) is added so that the total class (A) and class (B) monomer mole fraction is equal to 0.18. Azobis(isobutyronitrile) (0.003 molar parts based on 100 moles of monomers) is added, and the resulting solution sparged briefly with nitrogen to expel dissolved oxygen. The bottle is sealed and shaken at 55° C. for 21 hours and then at 60° C. for 3 hours. The copolymerization reaction generally gives conversions of about 95% of theoretical.

When the monomers are not soluble at the 7 molar part concentration even in the hot solution of class (A) monomer in acetone, for example, with the primary amide functional class (B) monomers of Examples 13 and 17, the molar concentration of the class (B) monomers is reduced and small amounts of water, i.e., up to 5 weight percent based on acetone, are added to give a homogeneous reaction mixture. In many such instances the copolymer precipitates as it forms at the usual conditions and the polymer mixture is allowed to cool and settle. The supernatant acetone-water is decanted and the residual copolymer dissolved in tetrahydrofuran as a clear, colorless, viscous solution.

Portions of copolymer solution (in acetone or tetrahydrofuran) are coated directly onto polyester film as previously described and dried for the subsequent evaluation.

A further portion of each above copolymer solution is dried thoroughly at reduced pressure and examined by differential thermal analysis to determine the glass transition temperature (T$_G$) of the copolymer. Values are recorded as the average of the glass transition temperature ranges observed in two runs.

Molecular weights are determined by gel permeation chromatography in tetrahydrofuran on further samples which have been methylated with diazomethane (both carboxyl OH and amide NH functions). The angstrom weight-average molecular weight thus obtained is multiplied by a standard conversion factor (100 for copolymers containing a preponderance of long-chain alkyl acrylate esters) to obtain weight-average molecular weight. This molecular weight is recorded and is believed accurate to within 10%.

For convenience hereafter numbers or letters are employed to refer to certain monomers. The class (B) monomers of the invention are referred to by the number of the Example of Table 1 in following Examples 19 through 39. Various conventional comonomers used in Examples 34 through 39 of Table 4 are symbolized in Table 2 with the initial "C" serving to emphasize that these do not form part of the invention. In these examples iso-octyl acrylate (IOA) is sed as the class (A) monomer.

Table 2

| Acrylic acid | CAA |
| --- | --- |
| Methacrylic acid | CMA |
| Acrylamide | CAM |
| Methacrylamide | CMM |
| N-vinylpyrrolidone | CVP |

A series of copolymers is prepared by the general procedure above using the class (b) monomers shown in 7 mole% amount and providing copolymers characterized as to physical properties and properties on a substrate as shown.

The improved "balance" of tape properties noted above is shown in Table 3 and elsewhere herein by an index number which is referred to as "Performance Index" or "Performance Contribution" (sometimes abbreviated as "PI"). This number is a composite number which is the sum of the differences in adhesion, tack and cohesion between the properties for adhesives under test and a comparison adhesive. Properties of adhesion and tack are recorded in grams for standard tests and for cohesion in minutes so that the composite number is an index not a specific value having dimensions. In the present examples where the comparison adhesive is one using solely the class (a) monomer, e.g., iso-octyl acrylate homopolymer of Example 34 so that:

$$PI = \left[\binom{\text{copolymer}}{\text{adhesion}} - \binom{\text{IOA homopolymer}}{\text{adhesion}}\right] +$$

$$\left[\binom{\text{copolymer}}{\text{tack}} - \binom{\text{IOA homopolymer}}{\text{tack}}\right] +$$

$$\left[\binom{\text{copolymer}}{\text{cohesion}} - \binom{\text{IOA homopolymer}}{\text{cohesion}}\right]$$

Table 3

| Example | Example for Class (b) Monomer | Molecular Weight × 10⁶ | $T_G$ (°C.) | Adhesion (Peel Force) g. | Tack (Probe) g. | Cohesion (Shear Strength) min. | PI |
| --- | --- | --- | --- | --- | --- | --- | --- |
| 19 | 1 | 2.7 | −52 | 1502 | 190 | 141 | 585 |
| 20 | 2 | 2.3 | −53 | 1474 | 204 | 138 | 568 |
| 21 | 14 | 3.2 | −52 | 1361 | 178 | 137 | 429 |
| 22 | 15 | 3.7 | −53 | 1332 | 168 | 134 | 386 |
| 23 | 16 | 3.7 | −53 | 1304 | 172 | 69 | 297 |
| 24 | 6 | 2.7 | −52 | 1474 | 183 | 68 | 477 |
| 25 | 10 | 2.5 | −51 | 1588 | 167 | 73 | 580 |
| 26 | 11 | 6.7 | −54 | 1588 | 175 | 62 | 577 |
| 27 | 12 | 3.1 | −50 | 1559 | 268 | 1050 | 1629 |
| 28 | 4 | 1.4 | −52 | 1928 | 245 | 75 | 1000 |
| 29 | 7 | 3.1 | −52 | 1247 | 155 | 133 | 287 |
| 30 | 3 | 5.0 | −50 | 1729 | 206 | 95 | 782 |
| 31 | 5 | 4.5 | −51 | 1531 | 207 | 113 | 603 |
| 32 | 8 | 2.1 | −48 | 1588 | 193 | 62 | 595 |
| 33 | 13 | 2.4 | −51 | 1389 | 202 | 47 | 390 |

For purposes of comparison a number of conventional comonomers are employed to make copolymers by the same procedures and in the same proportions as follows:

Table 4

| Example | Comonomer | MW | $T_G$ (°C.) | Adhesion (Tape Peelback) g. | Tack (Probe) g. | Cohesion (Shear Strength) min. | PI |
| --- | --- | --- | --- | --- | --- | --- | --- |
| 34 | IOA | 3.0 | −58 | 1134 | 107 | 7 | — |
| 35 | CAA | 3.2 | −53 | 1134 | 163 | 69 | 118 |
| 36 | CMA | 2.6 | −53 | 1134 | 168 | 45 | 99 |
| 37 | CAM | 3.4 | −55 | 1162 | 152 | 103 | 169 |
| 38 | CMM | 2.0 | −52 | 1274 | 182 | 93 | 301 |
| 39 | CVP | 2.7 | −53 | 1191 | 126 | 25 | 94 |

It will be seen that these fail to provide the balance of properties, giving PI values of 300 and less, mostly well below 200, whereas the adhesives of the invention of Examples 19–33 give PI values of from very near 300 to over five times that and mostly at least twice that.

The scope of the invention is further illustrated by the examples of Table 5 in which class (B) monomers containing primary amide functions are incorporated in the copolymer with iso-octyl acrylate (Examples 40, 41) in less than 7 molar parts because of solubility problems mentioned above and in which the class (A) monomer is either butyl acrylate (Example 42) or 2-ethylhexyl acrylate (Example 43).

Table 5

| Example | Example for Class (b) Monomer | Molar Ratio | Molecular Weight × 10⁶ | $T_G$ (°C.) | Adhesion (Peel Force) g. | Tack (Probe) g. | Cohesion (Shear Strength) min. |
| --- | --- | --- | --- | --- | --- | --- | --- |
| 40 | 13 | 99:1 | 4.0 | −55 | 1106 | 111 | 21 |
| 41 | 17 | 96.5:3.5 | 6.2 | −54 | 1106 | 151 | 274 |
| 42 | 1 | 95:5 | 2.3 | −42 | 1134 | 187 | 2013 |
| 43 | 1 | 93:7 | 2.1 | −61 | 1644 | 207 | 145 |

EXAMPLE 44

Use of a mixture of class (B) monomers, such as might result from acryloylation or methacryloylation of the hydrolysis product of a natural protein, is illustrated by grinding together the following compounds and amounts using a mortar and pestle to obtain a mixture of N-acryloylamino acids.

| N-Acryloylamino Acid of Example | Weight g. |
| --- | --- |
| 1 | 0.50 |
| 3 | 0.50 |
| 5 | 0.50 |
| 6 | 0.50 |
| 9 | 0.50 |
| 10 | 0.50 |
| 11 | 0.25 |
| 12 | 0.50 |
| 13 | 0.25 |
| 17 | 0.25 |

A portion (4.0 g.) of the above mixture is added to 53.1 g. of iso-octyl acrylate and 85.8 grams of acetone in a sealable bottle to give a polymerization mixture in weight proportions of 93:7 as 40% monomer solids in acetone. Azobis(iso-butyronitrile) (0.171 g.; 0.30 weight percent based on monomers) is added as the initiator. The solution is sparged briefly with nitrogen, the bottle is then sealed, and heated with agitation at 55° C. for 21 hours and at 60° C. for a further 3 hours. Evaporation of solvent yields a viscous copolymer which has a weight-average molecular weight of 2.2 million and $T_G$ of −50° C. A sample coated on polyester film as described previously has the following tape performance properties: adhesion = 1729 grams; tack = 195 grams; and cohesion = 167 minutes.

For many purposes pressure sensitive adhesives with relatively high cohesive strengths are desired. It is usually true that increases in concentration of a polar monomer increase the cohesive strength. In order to have a proper basis for comparison of tapes containing conventional polar comonomers and tapes of the invention containing class (B) monomers, equal numbers of polar functional groups should be compared. Thus, a copolymer of iso-octyl acrylate and acrylic acid (86:14 mole-mole) (Example 54 below) which contains 14 molar parts —COOH should be compared with a copolymer of iso-octyl acrylate and N-acryloylglycine (93:7 mole-mole) (Example 45 below) because of class (B) monomer is difunctional (i.e., contains both carboxyl and amide functions) and contains 7 molar parts —COOH and 7 molar parts —CONH—; this equal functional group comparison is herein designated "molar monofunctional equivalent."

Because the copolymers of N-acryloylglycine (Example 3) and N-acryloylaspartic acid (Example 12) produce excellent tapes and because these monomers are quite soluble in the acetone polymerization solvent and can therefore be incorporated at high molar levels, these two class (B) monomers are compared with acrylic acid (CAA) and acrylamide (CAM) which are common prior art comonomers for the production of acrylic pressure sensitive adhesives. Methacrylamide which is an excellent comonomer with iso-octyl acrylate at the 93:7 (mole to mole) level (Example 38 above) yields an insoluble crosslinked copolymer when used at an 86:14 level and is therefore unsuitable as a conventional comonomer for comparison purposes.

In Example 45–58 inclusive the level of the conventional polar comonomer (Examples 54–58) and the class (B) monomer (Examples 45–53) are increased relative to the iso-octyl acrylate until the peel adhesion of the resulting tape becomes "shocky" on removal. The term "shocky" is employed to describe the undesirable property in adhesive tapes which is exhibited as a very jerky irregular peeling during testing for adhesion; the force may register zero momentarily. Examples 59–61 provide data on terpolymers of conventional comonomers. The physical properties of the copolymers and tack (probe), adhesion (glass peel), and cohesion (shear performance) of tapes prepared with copolymers in which various proportions are used are given in Table 6. In these shear tests the load is increased to 1000 grams and the adhesive area has been reduced to ¼ the area used in Examples 3 through 44.

Thus the outstanding cohesive strength of Examples 48 and 53 can be compared with Examples 56, 58 and 61. The class (B) comonomers of the invention can be employed at higher levels before "shockiness" is encountered. Thus, improved pressure sensitive tapes with an excellent balance of the necessary threefold tape properties of tack, adhesion and cohesion are obtained using the copolymers of the invention.

Although the unexpected superiority of the class (B) monomers of the invention in imparting an overall balance of properties to pressure sensitive adhesives is not fully understood. It is considered possible that there may be formation of block copolymers. This possibility is supported by variations in glass transition temperatures in Examples 45–58. The regular 7°–8° C. increase in $T_G$ for Examples 54–56 with increasing acrylic acid content is believed evidence for random copolymer formation. In the copolymers with acrylamide (57 and 58), N-acryloylglycine (45–49) and N-acryloylaspartic acid (50–53) the $T_G$ values are approximately constant other than for the initial increase from Examples 45 to 46. This is contrued as evidence of the formation of blocks of the comonomer above some characteristic concentration which blocks are incorporated in the copolymer.

What is claimed is:

1. In adhesive-coated sheet material comprising in combination a self-sustaining backing sheet having a layer of normally tacky and pressure sensitive adhesive bonded to at least one face thereof, the improvement which comprises using as adhesive a copolymer of monomers consisting essentially of (A) at least one or more monomeric acrylic acid esters of primary and/or secondary alcohol containing from 4 to 8 carbon atoms, and (B) less than 50 mole percent of at least one comonomer copolymerizable with said acrylic acid ester represented by the structural formula:

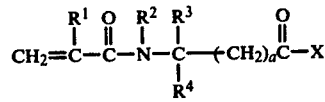

where

Table 6

| Example No. | Comonomer or Example | Mole Ratio | Molar Monofunctional Equivalent | MW × 10⁶ | $T_G$ (°C.) | Adhesion (Tape Peelback) g. | Probe Tack g. | Cohesion Shear Time min. |
|---|---|---|---|---|---|---|---|---|
| 45 | 1 | 93:7 | 86:14 | 2.7 | −52 | 1502 | 190 | 2 |
| 46 | 1 | 89.5:10.5 | 79:21 | 1.8 | −48 | 1616 | 321 | 12 |
| 47 | 1 | 86:14 | 72:28 | 1.8 | −46 | 1616 | 347 | 124 |
| 48 | 1 | 82.5:17.5 | 63:35 | 2.9 | −44 | 1276 | 357 | 3,463 |
| 49 | 1 | 79:21 | 58:42 | 1.7 | −46 | Shocky | 279 | 10,000+ |
| 50 | 12 | 95.3:4.7 | 86:14 | 1.8 | −53 | 2041 | 192 | 1 |
| 51 | 12 | 93:7 | 79:21 | 3.1 | −50 | 1559 | 268 | 51 |
| 52 | 12 | 90.7:9.3 | 72:28 | 3.4 | −52 | 1446 | 349 | 393 |
| 53 | 12* | 88.3:11.7 | 65:35 | 3.6 | −50 | 1219 | 335 | 2,480 |
| 54 | CAA | 86:14 | 86:14 | 2.5 | −47 | 1247 | 261 | 2 |
| 55 | CAA | 79:21 | 79:21 | 2.2 | −39 | 1304 | 346 | 16 |
| 56 | CAA | 72:28 | 72:28 | 1.5 | −32 | Shocky | 292 | 135 |
| 57 | CAM | 86:14 | 86:14 | 2.5 | −48 | 1219 | 264 | 106 |
| 58 | CAM | 79:21 | 79:21 | 2.0 | −48 | Shocky | 242 | 10,000+ |
| 59 | CAA + CAM | 86:7:7 | 86:14 | 3.8 | −47 | 1361 | 250 | 39 |
| 60 | CAA + CAM | 79:10.5:10.5 | 79:12 | 3.8 | −45 | 1276 | 246 | 1,643 |
| 61 | CAA + CAM | 72:14:14 | 72:28 | 6.8 | −42 | Shocky | 176 | 10,000+ |

*The copolymer solution is homogeneous but quite turbid.

It is evident that class (B) monomers of the invention yield adhesives with high levels of tack and adhesion and with higher cohesive strengths than copolymers or terpolymers using conventional polar comonomers.

$R^1$ is H or methyl;
$R^2$ is H, alkyl of 1-4 carbon atoms or —$CH_2CH_2CN$;

$R^3$ is H or alkyl of 1-4 carbon atoms;

$R^4$ is H, alkyl of 1-4 carbon atoms, $-CH_2C_6H_5$, $-(CH_2)_2SCH_3$, and

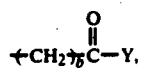

where b is 1 or 2 and Y is $-NH_2$ or $-OH$;

a is 0, 1, 2 or 3;

X is Y and $R^2$ and $R^3$ taken together can be $(CH_2)_3$.

2. The product of claim 1 wherein the adhesive coated sheet material is normally tacky and pressure sensitive adhesive tape which is capable of being wound convolutely upon itself in roll form, unwound therefrom without transfer of the adhesive to the backing and applied in a desired location.

3. The tape of claim 2 wherein the self-sustaining backing sheet is polyester.

4. The tape of claim 2 wherein the polyester backing sheet is polyolefin.

5. The tape of claim 2 wherein the self-sustaining backing sheet is cellulose acetate.

6. The tape of claim 2 wherein the self-sustaining backing sheet is polyvinyl chloride.

7. The tape of claim 2 wherein the self-sustaining backing is fibrous.

8. The tape of claim 2 wherein the self-sustaining backing is a low surface energy release liner and the layer of normally tacky and pressure sensitive adhesive is releasably adhered thereto.

* * * * *